(12) United States Patent
Kayama et al.

(10) Patent No.: US 7,116,902 B2
(45) Date of Patent: Oct. 3, 2006

(54) LENS DRIVING MECHANISM AND ELECTRONIC DEVICE

(75) Inventors: Shun Kayama, Saitama (JP); Yukiko Shimizu, Saitama (JP)

(73) Assignee: Sony Corporation, (JP)

( * ) Notice: Subject to any disclaimer, the term of this patent is extended or adjusted under 35 U.S.C. 154(b) by 34 days.

(21) Appl. No.: 10/843,481

(22) Filed: May 12, 2004

(65) Prior Publication Data

US 2004/0252989 A1  Dec. 16, 2004

(30) Foreign Application Priority Data

May 19, 2003 (JP) ............ P2003-140028

(51) Int. Cl.
*G03B 13/34* (2006.01)
*G02B 7/04* (2006.01)
*G02B 15/14* (2006.01)

(52) U.S. Cl. ............... 396/85; 396/133; 359/699; 359/824

(58) Field of Classification Search ........... 396/85–87, 396/144, 133; 359/696–698, 824, 699–701; 348/240.3

See application file for complete search history.

(56) References Cited

U.S. PATENT DOCUMENTS 4,605,286 A * 8/1986 Sumi .................... 359/696

FOREIGN PATENT DOCUMENTS

JP        08-223897        8/1996

* cited by examiner

*Primary Examiner*—W. B. Perkey
(74) *Attorney, Agent, or Firm*—Rader, Fishman & Grauer PLLC; Ronald P. Kananen

(57) ABSTRACT

Providing a lens driving mechanism that has a rotary cam connected to a cam pin for driving a lens, a rotor directly attached to the rotary cam, and a stator having a plurality of coils provided so as to face a plurality of poles of a magnet disposed along a rim of the rotor. Another lens driving mechanism has a rotary cam connected to a cam pin for driving a lens, a rotor directly attached to the rotary cam, a stator having a plurality of coils provided so as to face a plurality of poles of a magnet disposed toward the center of rotation along a rim of the rotor. Electronic device equipped with the lens driving mechanism is also provided.

6 Claims, 5 Drawing Sheets

LENS DRIVING MECHANISM AND ELECTRONIC DEVICE

CROSS REFERENCE TO RELATED APPLICATION

The present document is based on Japanese Priority Document JP2003-140028, filed in the Japanese Patent Office on May 19, 2003, the entire contents of which being incorporated herein by reference to the extent permitted by law.

BACKGROUND OF THE INVENTION

1. Field of the Invention

The present invention relates to a lens driving mechanism for driving a lens such as a zoom lens or a focus lens, and to an electronic device using this lens driving mechanism.

2. Description of the Related Art

In recent years, electronic devices provided with imaging devices have been developed, such as notebook computers, PDAs (Personal Digital Assistant) and mobile phones. Along with the improvement of performance of the imaging devices, making the imaging device smaller has become an indispensable requirement. Particularly, in a case where a small imaging device is incorporated into an electronic device, performance degradation tends to occur due to lens aberration if optical components are miniaturized. For that reason, there is limitation as to reduction of the lenses themselves. A key point is, therefore, to simplify components for holding the optical components, as well as driving mechanisms.

Conventionally, as an imaging device to be incorporated into the electronic device, one employing a single focus lens has been widely used. However, along with the increase of pixel number in an image sensor, one has been considered equipped with functions of focus adjusting and zooming by driving a lens. An image device using a motor as a driving force to drive a lens is disclosed in Patent document 1 (Patent document 1: Japanese Patent No. 3229508).

SUMMARY OF THE INVENTION

In the lens driving mechanism of the related art, as a small motor, for example, a stepping motor of rotary barrel type having approximately ϕ6 mm is employed. This is, however, the factor that limits a size of the mechanism to drive a lens to be thinner and smaller. Further, if the stepping motor itself is configured as a brush motor, there may be a fear of occurring of slit short. Furthermore, a problem of increased cost may rise as a result of increased number of component parts.

The present invention has been conceived to address the above-mentioned issues and aims at providing a lens driving mechanism, which has a rotary cam to be connected to a cam pin for driving, a rotor to be attached to the rotary cam directly, a stator having a plurality of coils disposed so as to face a plurality of poles of a magnet provided along a rim of the rotor.

Another lens driving mechanism of the present invention has a rotary cam to be connected to a cam pin for driving a lens, a rotor to be attached to the rotary cam directly, a stator having a plurality of coils disposed so as to face a plurality of poles of a magnet disposed along a rim of the rotor toward the center of rotation. The electronic device of the present invention is equipped with this lens driving mechanism.

In the present invention, the rotor is attached to the rotary cam directly and the coils of the stator are disposed so as to face a plurality of poles of the magnet provided along the rim of the rotor; therefore, a small driving mechanism in which the rotary cam is incorporated into the stepping motor constituted by the rotor and the stator is realized.

According to the present invention, the following effects may be expected. That is, it is possible to make the lens driving mechanism smaller and thinner while reducing its power consumption. At the same time, costs can be reduced and its reliability can be improved. The lens driving mechanism may drive a lens even being attached in a limited space of the electronic device. Therefore, making the imaging device smaller and achieving its performance higher may be possible.

DESCRIPTION OF THE PREFERRED EMBODIMENT

Figure 1:
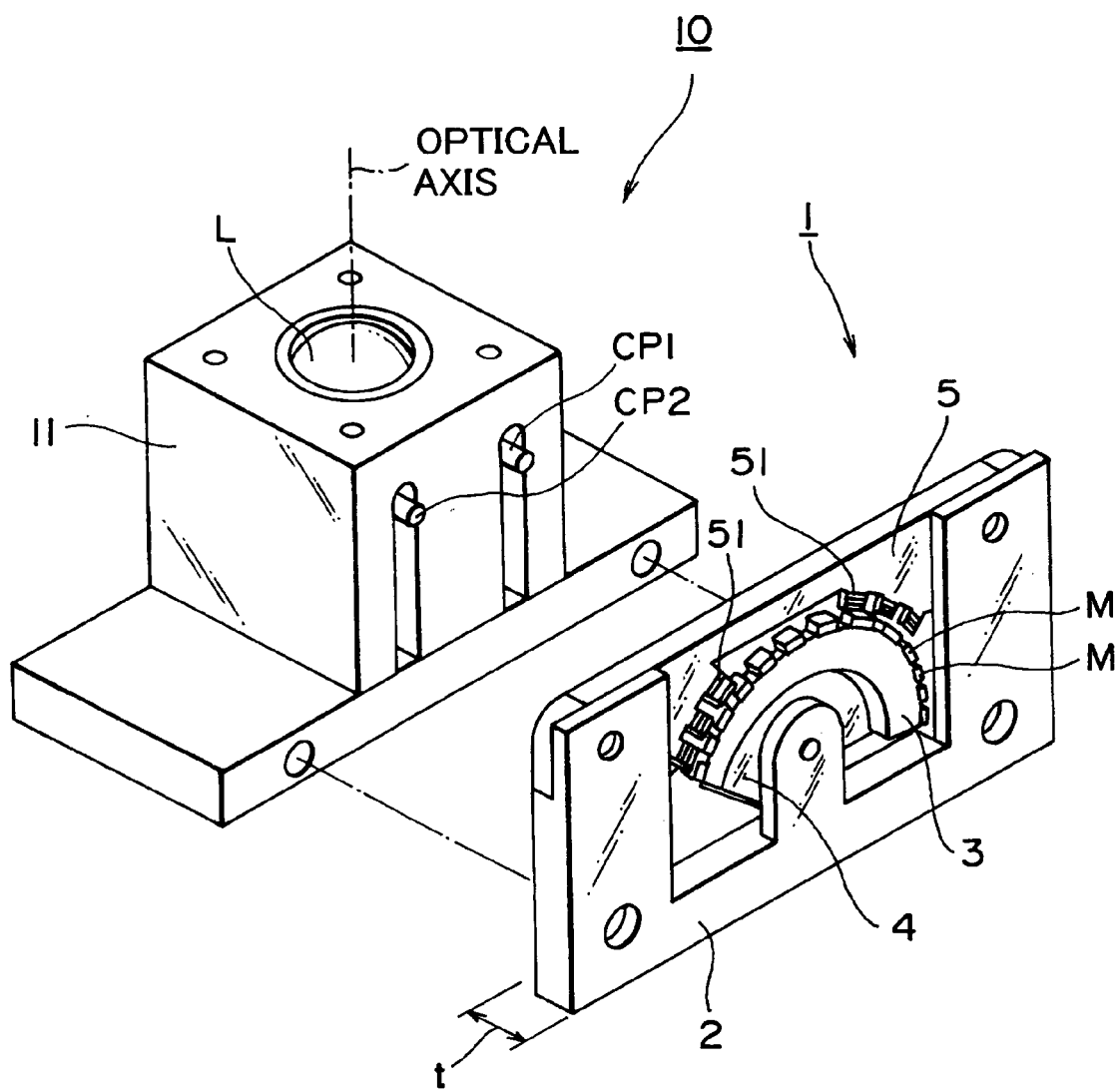
FIG. 1 is a schematic perspective diagram explaining an application situation of a lens driving mechanism according to the present embodiment.
Figure 2:
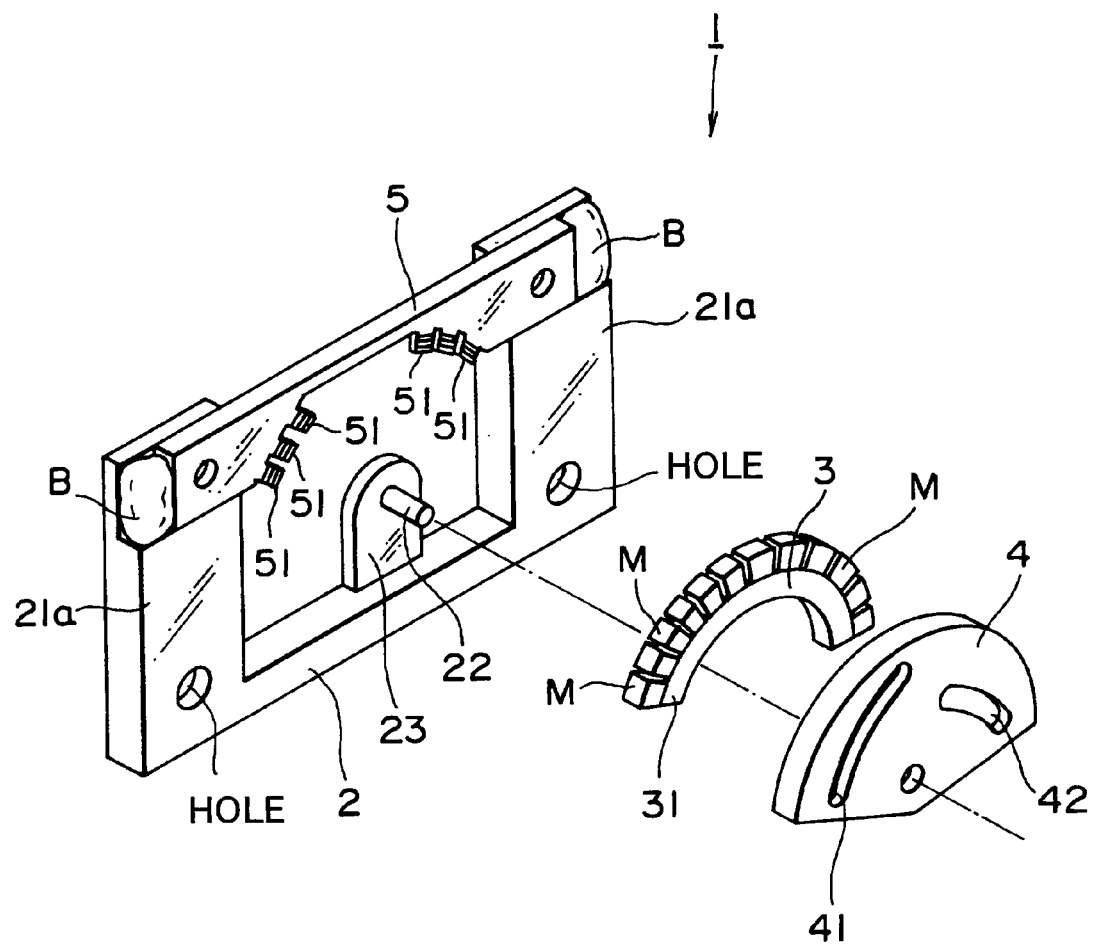
FIG. 2 is an exploded perspective view of a lens driving mechanism according to the present embodiment.

Hereinafter, detailed description of the preferred embodiments according to the present invention is explained based on drawings. FIG. 1 is a schematic perspective diagram explaining an application situation of the lens driving mechanism, and FIG. 2 is an exploded perspective view of the lens driving mechanism. The lens driving mechanism drives, for example, a predetermined lens "L" of a lens block 10 shown in FIG. 1 to move forward-backward along an optical axis direction.

This lens block 10 is constituted of, for example, four pieces of lenses (only the lens L is shown in the figure), a central lens is constituted of a cemented lens (two pieces of lenses), and an imager (not shown) is attached at the bottom of the lens block 10 in the figure.

Two cam pins CP 1 and CP 2 are extended from a case 11 of the lens block 10. These cam pins CP 1 and CP 2 move up and down in the figure, so that each of the two lens moves forward-backward along an optical axis direction, respectively, within the lens block 10.

A thickness "t" of the whole lens driving mechanism 1 of the present embodiment is approximately 2.8 mm. The lens driving mechanism 1 is attached to a side plane of the case 11 of the lens block 10. The zoom function is realized by making the lens L move forward-backward, for example.

The lens driving mechanism 1 is configured such that a thin plate-shaped rotor 3 constituting a stepping motor and a stator 5 are assembled in an approximately central space of a base plate 2. More specifically, the rotor 3 is rotatably provided in the approximately central space of the base plate 2, the stator 5 having a plurality of coils disposed so as to face a plurality of poles of a magnet M provided along a rim of the rotor 3 attached at an opening of the base plate 2. In addition, a disk-shaped rotary cam 4 is directly overlapped on the rotor 3, which converts a rotating motion of the rotor 3 to a linear motion in order to move the cam pin CP1 and CP2 forward-backward toward the optical axis direction.

As shown in FIG. 2, the base plate 2 of the lens driving mechanism 1 is formed in a U-shape so as to have space at approximately a central portion, and a support member 23 supporting a support shaft 22 is extended from the bottom of the space toward the center portion. Upper portions of a right and left side standing plates 21a of the base plate 2 are partially cut in order to attach the stator 5 there. The right and left side standing plates 21a have holes respectively to be fixed to the case 11 of the lens block 10 shown in FIG. 1 with screws.

The stator 5 is constituted by two cores being attached together and wound with wiring of a coil 51, and fixed with an adhesive B such that the stator 5 is set at the cut portion provided on the upper ends of the right and left side of the standing plates 21a of the base plate 2. The size of the cut portion is substantially equal to the thickness of the stator 5, so that the stator 5 does not protrude from the base plate 2 when the stator 5 is attached to the base plate 2 and the coils 51 are disposed to face the space of the base plate 2.

The rotor 3 is configured in which a plurality of magnets M is attached facing outwards along a rim of an arc-shaped yoke 31 and connected directly to a plate-shaped rotary cam 4 by overlapping onto the rotary cam 4. Alternatively, instead of providing a plurality of magnets M along the rim of the yoke 31, an integrated magnet may be provided along the rim of the yoke 31 so as to be a multipole structure; this will enable a reduced magnet cost. With this arrangement, a central hole of the rotary cam 4 is fitted into a shaft 22 of the base plate 2, thereby holding the rotor 3 and rotary cam 4 rotatably inside the space of the base plate 2.

When the rotor 3 is attached to the base plate 2 through the rotary cam 4, the magnets M of the rotor 3 and the coils 51 of stator 5 face each other with a small gap therebetween, whereby the stepping motor is formed. In other words, according to the present embodiment, a very thin driving mechanism may be realized because the stepping motor and rotary cam 4 are formed unitedly.

The rotary cam 4 has two grooves (holes) 41 and 42 having a predetermined curve shape. The cam pins CP 1 and CP 2 of the lens block 10 as shown in FIG. 1 engage with the grooves 41 and 42 so that a rotary motion of the rotary cam 4 is converted into a linear-motion of the cam pins CP 1 and CP 2, thereby driving forward-backward movement along an optical axis direction of the lens L.

When the rotary cam 4 engages with the shaft 22 of the base plate 2, for example, they slide through a thrust receiver made of fluorine resin, and a stopper is inserted to the shaft 22 to determine a height direction (a insert direction to the shaft 22).

With the above arrangement, it is possible to set a rotation step of the rotor 3 with a different phased current control to the coil 51 by a phase relation between the magnet M of the rotor 3 and the coil 51 of the rotor 3.

Figure 3:
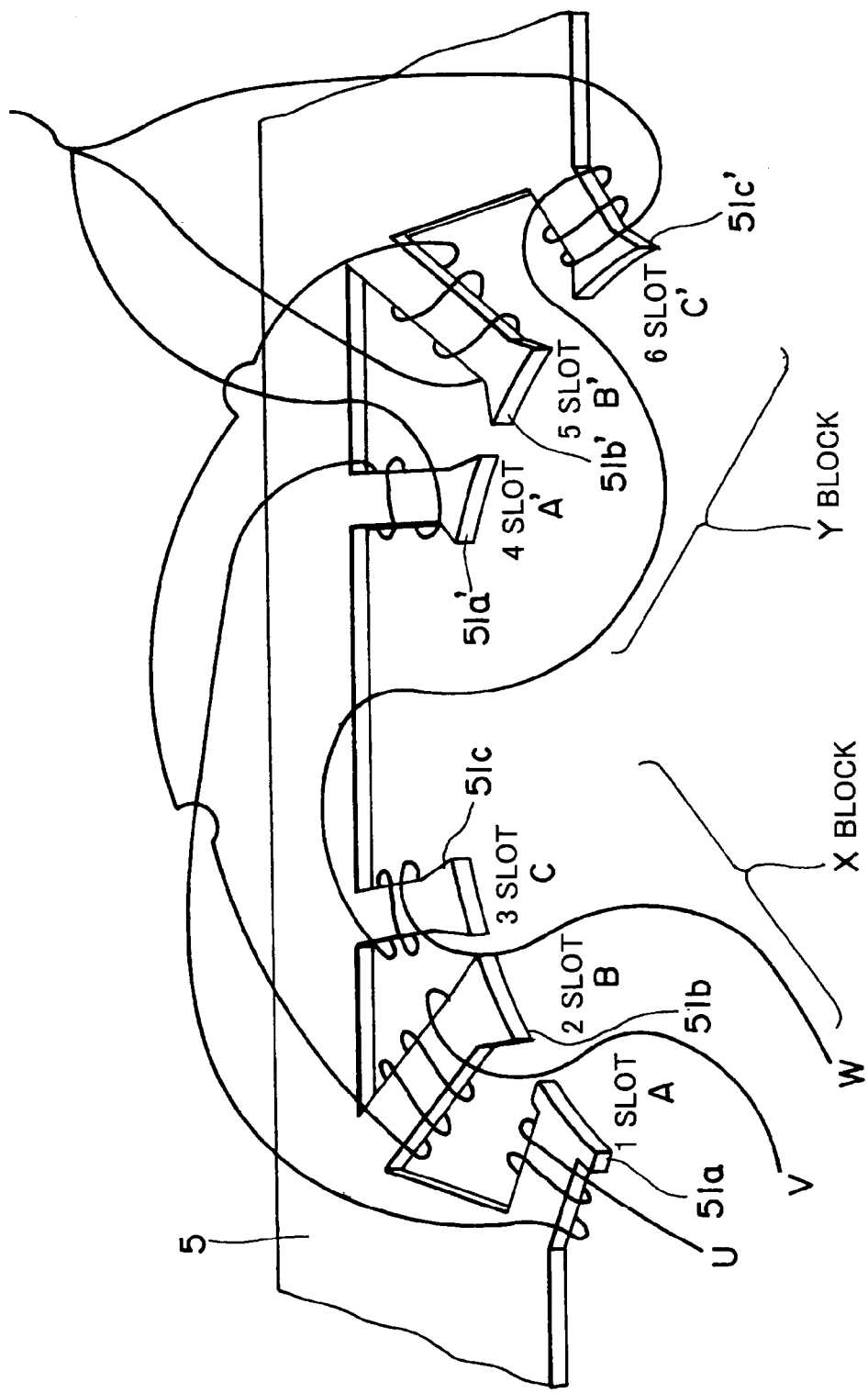
FIG. 3 is a schematic diagram explaining a stator.

FIG. 3 is a schematic diagram explaining a stator. In the present embodiment, six coils 51a to 51c and 51a' to 51c' are arranged to the stator 5 and divided into an X block of the coil 51a to 51c, and a Y block of the coil 51a' to 51c'.

Among these coils, the coil 51a of a first slot and the coil 51a' of a fourth slot are defined as A–A' having the same winding and the same number of turns and to which a first phase current is applied. The coil 51b of a second slot and the coil 51b' of a fifth slot are defined as B–B', which are wound with same winding and same number of turns, and to which a second phase current is applied. The coil 51c of a third slot and the coil 51c' of a sixth slot are defined as C–C', which are wound with same winding and same number of turns, and to which a third phase current is applied. In other wards, magnetic fields are sequentially generated by applying the different phased currents to A–A', B–B', C–C' so that an attractive force is generated between the magnets M of the rotor 3, thereby rotating the rotary cam 4 with a predetermined step.

More specifically, as a three-phase current U, V and W is switched and applied to A–A', B–B', C–C', it is possible to forward one pitch in both way gained from the phase between the coil 51 of the stator 5 and the magnet M of the rotor 3 for each applied pulse. Although the present embodiment employs a three-phase control structure (U, V, W, and COM), it may be possible to realize by a two-phase control structure (A, B, and COM).

Further, in the example shown in FIG. 1 and FIG. 2, the configuration in which the stator is disposed far from the rotor 3 and the rotary cam 4 is explained. However, if a stator 50 wound with wiring as shown in FIG. 4 is disposed at the center of rotation from the rotor 3, the torque of the rotor 3 may be increased.

Figure 4:
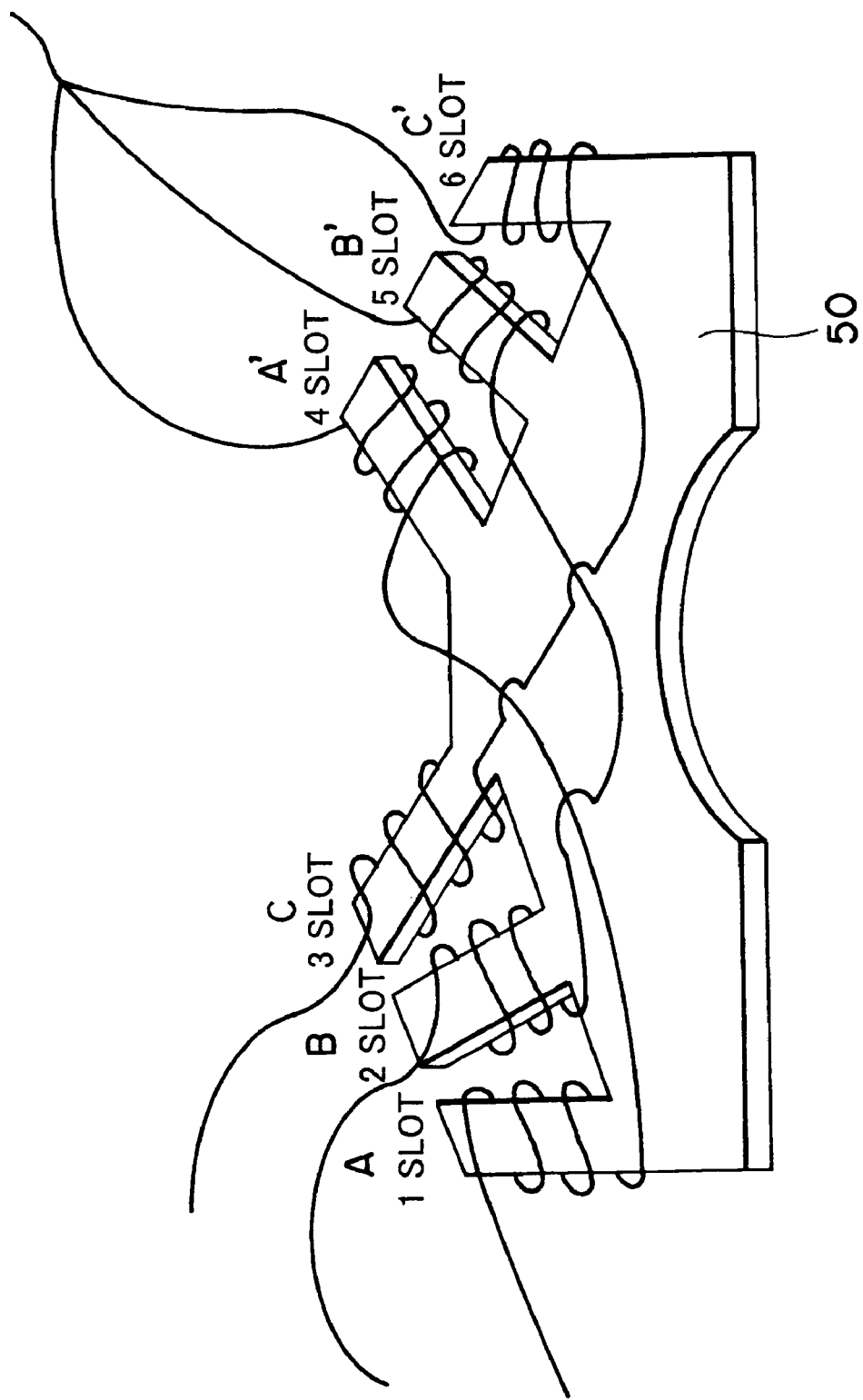
FIG. 4 is a schematic diagram explaining another stator.

In other words, the stator 50 shown in FIG. 4 is attached at the bottom of the space of the base plate 2 shown in FIG. 2. In addition, if a plurality of magnets (an integral multipole magnet may be usable) are arranged at the internal circumference of the rotor 3, the coils of the stator 50 and the magnets at the internal circumference of the rotor 3 are disposed so as to face each other. With this arrangement, the stator 5 and stator 50 are disposed at outer and inner circumferences, thereby enabling an increased torque to the rotor 3 even in the above mentioned three-phase control structure.

With the above described arrangement, it is possible to make the lens driving mechanism smaller and thinner while reducing the number of the components. At the same time, costs may be reduced and its reliability may be improved. Further, since a stepping motor is used as a driving force, an electric current is applied to the rotor 3 only during the operation, and the rotor 3 can be held at the position by magnetic force of the magnet M even when an electric current is not applied; thus, the power consumption may be lowered.

In the above description, the example of disposing the stator 5 at the outside of the rotor 3 and the example of disposing the stator 5 and 50 at the outside and inside of the rotor respectively. However, the stator 50 may be disposed only inside of the rotor 3. This arrangement realizes further downsizing of the lens driving mechanism 1.

Figure 5:
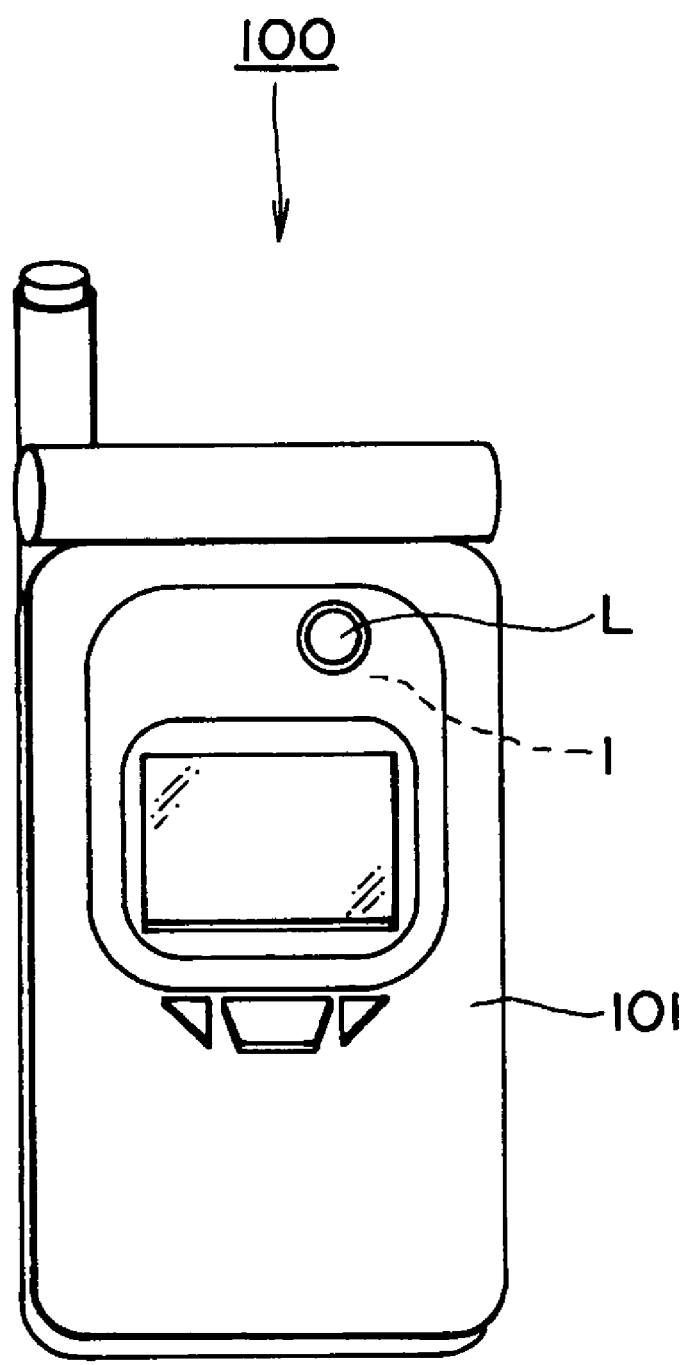
FIG. 5 is a schematic block diagram explaining application to a mobile phone.

FIG. 5 is a schematic block diagram that shows an application example of the lens driving mechanism according to the present embodiment. In this example, the lens driving mechanism 1 is incorporated into a mobile phone 100. A lens L of an imaging device is exposed to the outside from a body housing 101 of the mobile phone 100 and images can be imported through the lens L.

In order to drive the lens L to perform the forward-backward movement along an optical axis direction, the lens driving mechanism 1 described earlier is used. In recent years, as the mobile phone 100 is normally equipped with an imaging device, requirements for imaging performance of the imagining device has become severe. Since the lens driving mechanism 1 of the present embodiment may significantly be downsized, if a mobile phone has even only limited space to install it, the lens L may be drove. Therefore, it is possible to provide the mobile phone 100 having the small sized imaging device with high performance.

For example, if the lens driving mechanism 1 having the above configuration is applied to zoom driving of the lens L of the mobile phone 100, the rotor 3 is step moved in eight positions by sequentially applying a three-phase current to the coil 51 of the stator 2 shown in FIG. 1. It is possible to obtain an optical zoom magnification corresponding to the eight positions.

Other than applying to a mobile phone, the lens driving mechanism 1 may also be incorporated in various kinds of devices such as PDAs, laptop computers, digital still cameras, digital video cameras and so on.

Finally, the embodiments and examples described above are only examples of preferred embodiments of the present invention. It should be noted that the present invention is not restricted only to such embodiments and examples, and various modifications, combinations and sub-combinations may be made without departing from the scope of the present invention.

What is claimed is:

1. A lens driving mechanism comprising:
    a rotary cam connected to a cam pin for driving a lens;
    a rotor directly attached to said rotary cam; and
    a stator having a plurality of coils disposed so as to face a plurality of poles of a magnet provided along a rim of the rotor, wherein said rotary cam and said rotor are flat-plate shaped, said rotor being directly superposed on said rotary cam and attached to each other.

2. The lens driving mechanism according to claim 1, wherein said lens driving mechanism is configured such that said flat-plate shaped rotor constituting a stepping motor and said stator are assembled in an approximately central space of a base plate for a lens block.

3. A lens driving mechanism according to claim 2, wherein said rotor is rotatably provided in the approximately central space of said base plate, said stator having a plurality of coils disposed so as to face a plurality of poles of a magnet provided along a rim of the rotor attached at an opening of the base plate.

4. The lens driving mechanism according to claim 3, wherein wherein said base plate is secured to a lens block having a lens movable along an optical axis, and at least one cam pin supported by an opening in said rotary cam so that rotary motion of the rotary cam is converted into a linear motion of the cam pin, thereby driving forward-backward movement along said optical axis of said lens.

5. An electronic apparatus having a lens driving mechanism to drive a lens for imaging, said lens driving mechanism comprising:
    a rotary cam connected to a cam pin for driving a lens;
    a rotor directly attached to said rotary cam; and
    a stator having a plurality of coils disposed so as to face a plurality of poles of a magnet provided along a rim of the rotor, wherein said rotary cam and said rotor are flat-plate shaped, said rotor being directly superposed on said rotary cam and attached to each other.

6. The lens driving mechanism according to claim 4, wherein said base plate housing said stator, said rotary cam and said rotor is about 2.8 mm in thickness.

* * * * *